(12) United States Patent
Ebert et al.

(10) Patent No.: US 6,343,541 B1
(45) Date of Patent: Feb. 5, 2002

(54) DAMPING DEVICE FOR HYDRAULIC ADJUSTMENT DEVICES IN MOTOR VEHICLES

(75) Inventors: Angelika Ebert; Wolfgang Grosspietsch, both of Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/255,324

(22) Filed: Feb. 23, 1999

(30) Foreign Application Priority Data

Feb. 24, 1998 (DE) .......................................... 198 07 446

(51) Int. Cl.[7] .............................................. F01B 29/00
(52) U.S. Cl. .............................. 92/143; 60/591; 91/435
(58) Field of Search ........................ 60/591; 192/109 F; 137/493.8; 92/8, 143; 91/435, 440, 422; 188/290, 294, 296, 307

(56) References Cited

U.S. PATENT DOCUMENTS

| | | | | |
|---|---|---|---|---|
| 2,748,898 A | * | 6/1956 | Bourcier De Carbon | ... 188/317 |
| 3,078,676 A | * | 2/1963 | Blair | ......................... 60/591 X |
| 3,213,624 A | * | 10/1965 | Porter | ........................ 60/591 X |
| 3,269,409 A | * | 8/1966 | Ansell | ........................ 60/591 X |
| 3,339,680 A | * | 9/1967 | Tuneblom | ............ 137/493.8 X |
| 3,493,270 A | * | 2/1970 | Doerfler | .................... 60/591 X |
| 3,572,845 A | * | 3/1971 | Johannesen | ............... 60/591 X |
| 3,643,687 A | * | 2/1972 | Hudson, Jr. | .......... 137/493.8 X |
| 4,429,552 A | * | 2/1984 | Reedy | ..................... 137/468 X |
| 4,464,900 A | * | 8/1984 | Bainbridge | .................. 60/591 |
| 4,721,130 A | * | 1/1988 | Hayashi | ............... 137/493.8 X |
| 4,986,404 A | * | 1/1991 | Kajitani et al. | .......... 192/109 F |
| 5,025,640 A | * | 6/1991 | Drucker | ............... 137/493.8 X |
| 5,070,983 A | * | 12/1991 | Leigh-Monstevens et al. | ... 192/ 109 F X |
| 5,209,553 A | | 5/1993 | Burgdorf et al. | |
| 5,320,203 A | * | 6/1994 | Wilber et al. | ............. 192/109 F |
| 5,584,226 A | * | 12/1996 | Roemer et al. | ...... 137/493.8 X |
| 6,003,427 A | * | 12/1999 | Asbrand et al. | ..... 137/493.9 X |

FOREIGN PATENT DOCUMENTS

| | | |
|---|---|---|
| DE | 17353 | 7/1959 |
| DE | 2 355 254 | 5/1974 |
| DE | 31 06 344 | 10/1982 |
| DE | 43 34 551 | 4/1995 |
| DE | 44 35 258 | 5/1995 |
| DE | 195 00 908 | 1/1996 |
| DE | 197 30 030 | 1/1998 |
| FR | 1 316 544 | 4/1963 |
| GB | 2 097 898 | 11/1982 |
| JP | 59 089833 | 5/1984 |

* cited by examiner

Primary Examiner—John Ryznic
(74) Attorney, Agent, or Firm—Cohen, Pontani, Lieberman & Pavane

(57) ABSTRACT

A damping device for installation in a hydraulic adjustment device such, for example, as for motor vehicle clutches. The hydraulic adjustment device has a cylinder that is either an input cylinder or actuator or an output cylinder. The input cylinder or actuator, which is connected to an operating pedal of the motor vehicle, is also connected to the output cylinder via a hydraulic line filled with fluid. The damping device opposes a throttle resistance to the flow of the fluid in both flow directions. The damping device comprises a disk having first and second spring washers on either side of the disk. The disk has passage openings, which are covered on the respective sides by one of the first and second spring washers. The damping device is installed in the hydraulic adjustment device to suppress disturbing vibrations acts as both a vibration filter and an operating speed limiter. In addition, a constant throttle resistance is maintained relative to the fluid at all ambient temperatures.

38 Claims, 5 Drawing Sheets

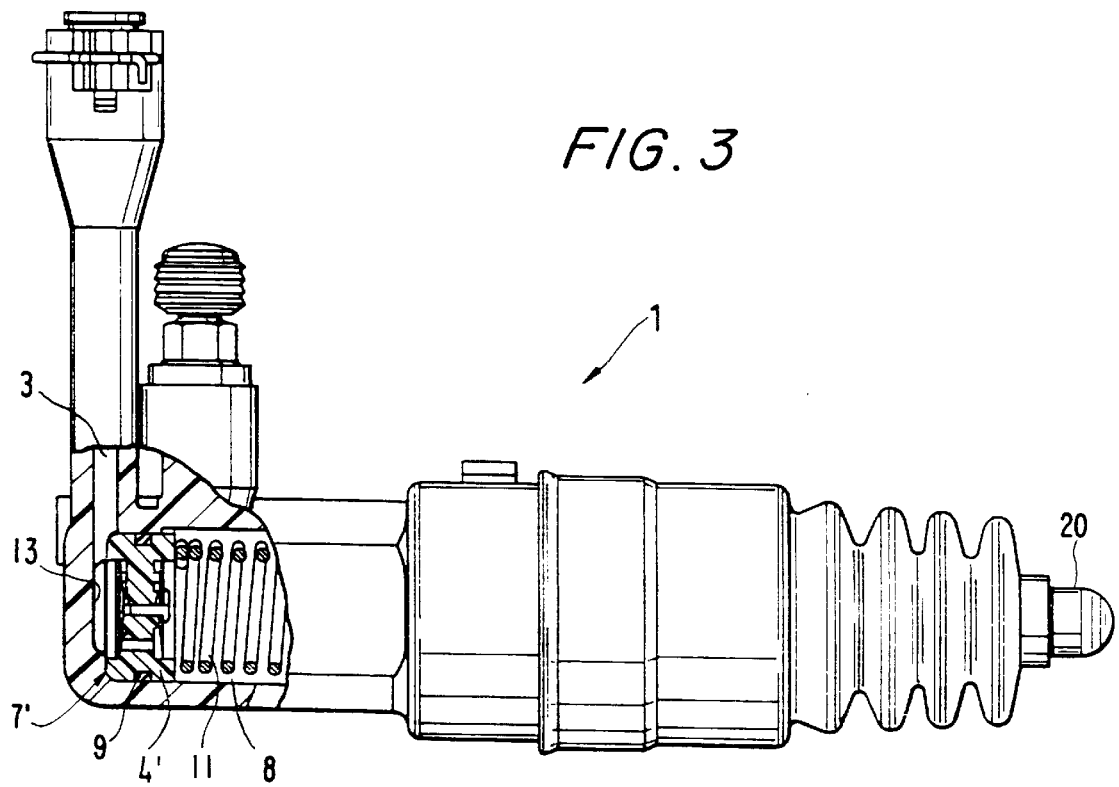
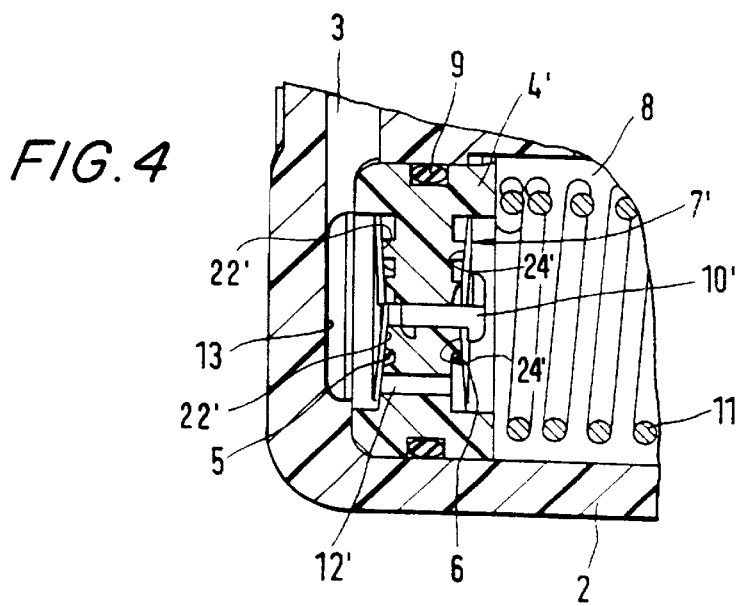

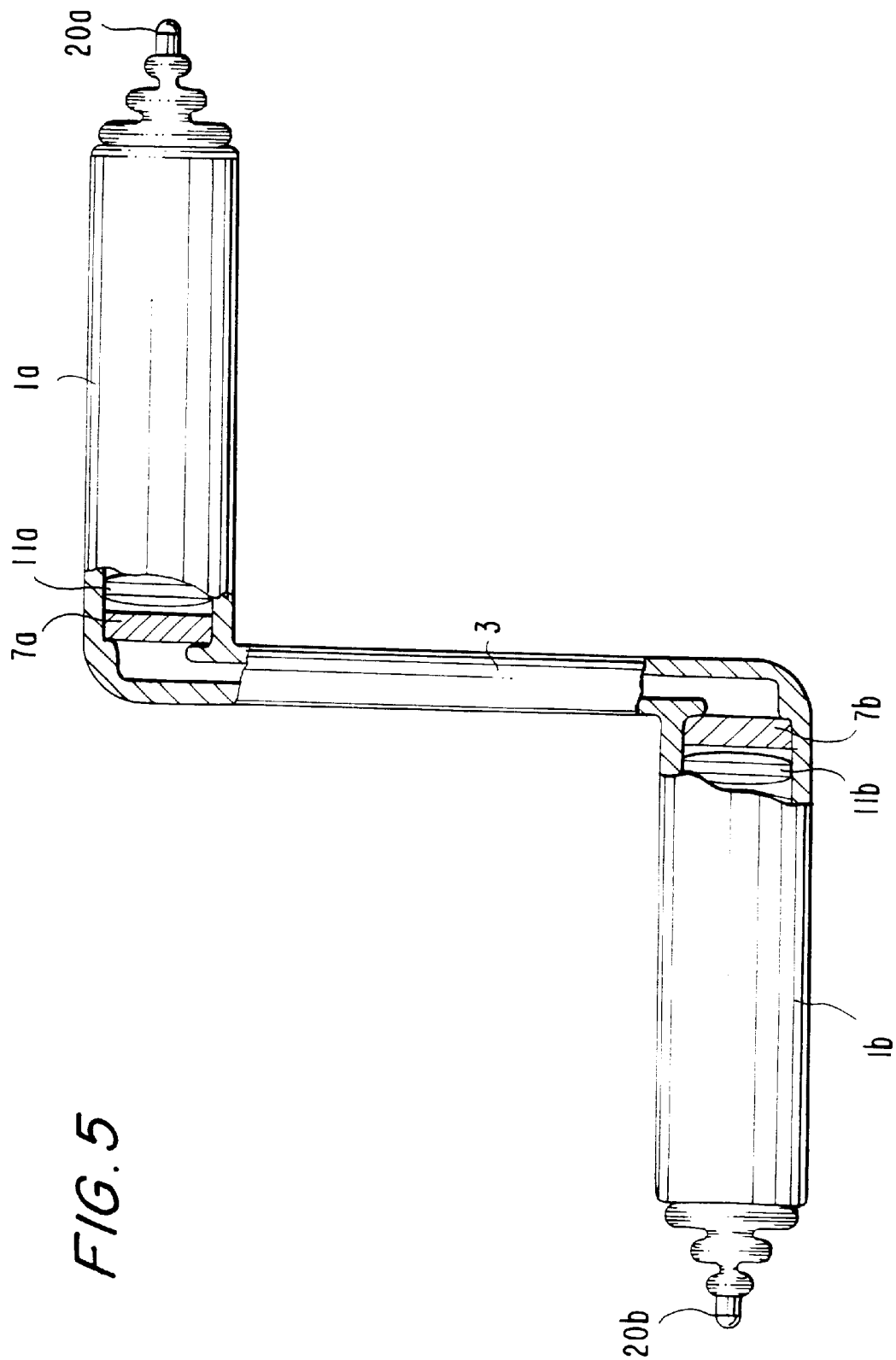

DAMPING DEVICE FOR HYDRAULIC ADJUSTMENT DEVICES IN MOTOR VEHICLES

BACKGROUND OF THE INVENTION

1. Field of the Invention

The invention relates to a damping device for use with hydraulic adjustment devices in motor vehicles having an input cylinder and an output cylinder connected by a hydraulic line filled with fluid.

2. Description of the Related Art

A prior art device for damping vibrations in hydraulic systems is disclosed in German reference DE 195 00 908 C1. This prior art device has a damping device connected to a pressure medium line. In the damping device, a valve device is integrated into a housing and can be axially moved by hydraulic pressure. The damping device comprises a valve device arranged movably between two guide disks. Each movement direction is associated with a spring, and the valve device forms a leakage gap with the housing. The object of the invention is to create a damping device that can damp volume fluctuations or pressure pulsations without disadvantageously influencing the efficiency or function of the hydraulic system. In hydraulic disengagement systems for motor vehicle clutches, axial vibrations originating in the vehicle's internal combustion engine are transmitted by the friction clutch and its diaphragm spring to the clutch disengagement bearing and the disengagement devices connected thereto. These axial vibrations pass throughout the entire hydraulic disengagement system and can cause an unpleasant tingling sensation when the clutch pedal is touched. The proposals in DE 195 00 908 C1 are not suitable for suppressing the extremely short vibration distances of the fluid, because the pulsing pressure can be transmitted through the open gap, and also because the damping device, due to its mobility, is caused to vibrate at least at certain frequencies and thus serves as a conduit for high-frequency vibrations.

SUMMARY OF THE INVENTION

The damping device proposed by the present invention includes a vibration filter, similar to a shock absorber bottom valve, that may be mounted in an input cylinder, an actuator, an output cylinder, or a hydraulic line arranged between the aforementioned cylinders in a hydraulic adjustment device. The vibration filter comprises axially fixed (i.e., axially immovable) valve devices, namely spring washers, which pivot elastically depending on the hydraulic flow or hydraulic pressure and thus activate and deactivate the provided flow cross-sections. The action of the vibration filter is adjustable by varying the spring washer elasticity, e.g., disk thickness and material, the number of spring washer devices, or the prestress, size, number and curve of the passage cross-sections. The flow may be adjusted differently and optimized for each of the two opposing directions through the vibration filter. In addition to possibly being housed in the hydraulic line, the vibration filter may be installed directly in the housing in the cylinder interior of the input cylinder or, preferably, the output cylinder. Specifically, the vibration filter is mounted in both the connection area and in the actual cylinder interior between the cylinder bottom and the piston.

The vibration filter or damping device is inserted as a cylindrical or disk-shaped device into the cylinder interior and is fixed in place in the vicinity of the cylinder bottom in a space-saving manner. The vibration filter may be fixed by positive locking (e.g., snapped into the bottom contour or fixed by an axial stop via a retainer ring), force locking (e.g., via the spring integrated in the cylinder interior), or friction locking or material bonding between the damping device and the cylinder wall of the cylinder interior.

Finally, the choice of flow cross-sections in the damping device makes it possible to integrate an operating speed limiter (peak torque limiter) function along with the vibration filter function by deliberately selecting the dimensions of the passage cross-section from the clutch side to the pedal side for this purpose. If the spring washers are not axially fixed in a rigid manner, but rather are fixed by thermally variable support devices, e.g., bimetals or memory devices, then the vibration filter and peak torque limiter functions may also be thermally varied such, for example, as to correspond to the sharply changed viscosity of the hydraulic medium in a low temperature range.

The object of the invention is to provide a damping device for hydraulic adjustment devices in motor vehicles that suppresses hydraulic vibrations originating in the internal combustion engine of the motor vehicle.

The object of the invention is met by a damping device for use with a hydraulic adjustment device having an input cylinder and an output cylinder, the input cylinder being connected to the output cylinder by a hydraulic line filled with fluid. The damping device establishes a throttle resistance to the flow of the fluid in at least one of the two flow directions and includes a disk having first and second opposing sides and a plurality of passage openings through the disk, a first spring washer arranged on the first side of the disk, and a second spring washer arranged on the second side of the disk, wherein each of the passage openings is covered by one of the first and second spring washers.

The object of the invention is also met by a hydraulic adjustment device including an input cylinder having an input cylinder interior and an output cylinder having an output cylinder interior. A hydraulic line filled with a fluid connects said input cylinder interior with said output cylinder interior and a damping device is operatively arranged for opposing a throttle resistance to a flow of the fluid in at least one of two flow directions through said hydraulic line. The damping device is arranged within one of the input and the output cylinder interiors and separates the one of the input and output cylinder interiors from the hydraulic line.

The object of the invention is also met by a hydraulic adjustment device for actuating a motor vehicle clutch including an input cylinder having an input cylinder interior, an output cylinder having an output cylinder interior and a hydraulic line filled with a fluid and connecting the input cylinder interior with the output cylinder interior. A damping device is operatively arranged for exerting a throttling effect on the fluid flowing toward the input cylinder during clutch engagement such that a maximum permissible clutch engagement speed is not exceeded.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 3 shows a cylinder with a damping device according to another embodiment of the present invention;

FIG. 4 is an enlarged detail of FIG. 3, showing the damping device in the vicinity of the bottom of the cylinder;

FIG. 5 shows a hydraulic adjustment device having an input cylinder and an output cylinder according to an embodiment of the invention;

DETAILED DESCRIPTION OF THE PRESENTLY PREFERRED EMBODIMENTS

Figure 1:
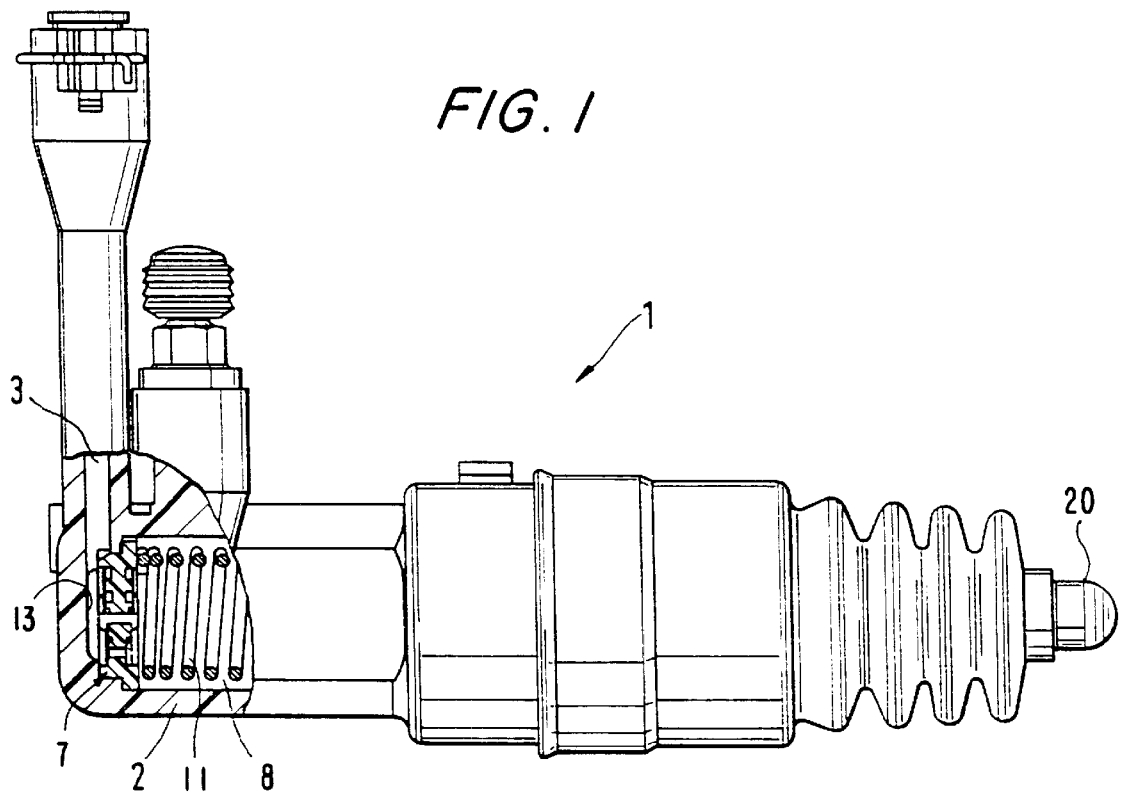
FIG. 1 shows a cylinder with a damping device according to an embodiment of the present invention.
Figure 2:
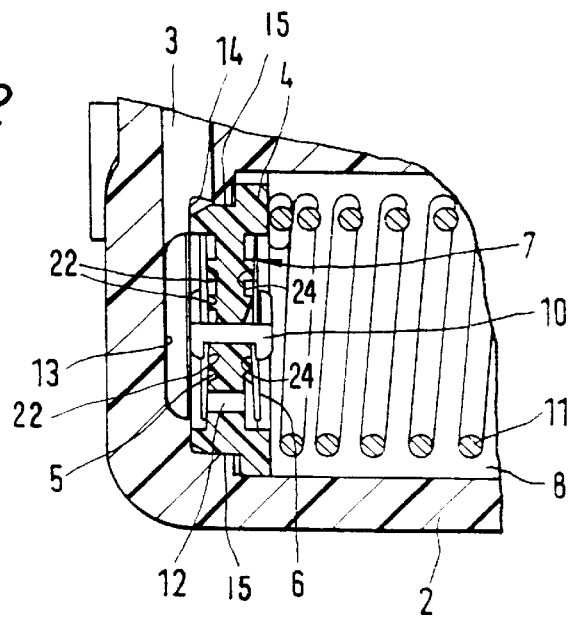
FIG. 2 is an enlarged detail of FIG. 1, showing the damping device in the vicinity of the bottom of the cylinder interior.

Referring to FIGS. 1 and 2, a cylinder 1 of a hydraulic adjustment device for motor vehicles comprises a housing 2 defining a cylinder interior 8 and connected to a hydraulic line 3. A spring 11 is arranged in the cylinder interior 8 for attaching a damping device 7 near the bottom 13 of the cylinder interior 8. The damping device 7 comprises a disk 4, a first spring washer 5 and a second spring washer 6. The spring washers 5 and 6 are connected to the disk 4 by a prestress device 10. The disk 4 has passage openings 12, which are alternately covered by the first spring washer 5 and then by the second spring washer 6.

The disk 4 has a contact surface 22 facing spring washer 5 and a contact surface 24 facing spring washer 6. The contact surfaces 22 and 24 of the disk 4 respectively facing the spring washers 5 and 6 have a conical shape such that the radial outer end of the disk 4 in the area of the spring washers 5 and 6 has a greater thickness between the contact surfaces 22 and 24 than the radial inner area. As a result, when the spring washers 5 and 6 are connected to the disk, the radial inner ends of the spring washers 5 and 6 are prestressed toward the disk 4 by the prestress device 10 so that the passage openings 12 are covered under prestress.

FIGS. 3 and 4 show a cylinder 1 with an interior 8. A damping device 7' with a seal 9 is arranged in the interior 8 of the cylinder 1. The damping device 7' including a disk 4' and spring washers 5 and 6 is fixed in the vicinity of the bottom 13. The spring washers 5 and 6 area respectively connected by a prestress device 10' to contact surfaces 22' and 24' on the disk 4'. As described above regarding the disk 4 in FIGS. 1 and 2, the contact surfaces 22' and 24' have a conical shape such that the radial outer end of the disk 4' in the area of the spring washers 5 and 6 has a greater thickness between the contact surfaces 22' and 24' than the radial inner area. The disk 4' has openings 12', which are covered on both sides by the spring washers 5 or 6 under prestress.

In both embodiments shown in FIGS. 1–4, when the cylinder 1 comprises an output cylinder in a hydraulic adjustment device, fluid is pressed through the hydraulic line 3 against the damping device 7, 7' upon operation of an operating pedal. As a result, the fluid penetrates into the passage openings 12, 12' that are not covered by the first spring washer 5. However, the second spring washer 6 is prestressed against the other side of the passage openings 12, 12' that are not covered by the first spring washer 5. When a certain pressure is reached, the second spring washer 6 lifts from the passage opening 12, 12' allowing the fluid to enter the cylinder interior 8 of the cylinder 1. This flow of fluid causes an operating element 20 to be pushed out of the cylinder 1 (to the right in FIGS. 1 and 3) for performing an operation such, for example, as disengaging a clutch. When the operating pedal is released, the piston of the cylinder 1 is pushed back by the diaphragm spring of the clutch via operating element 20, and the fluid passes through the disk 4 via the passage openings 12, 12' not covered by the second spring washer 6. The fluid flowing through these openings 12, 12' opens the first spring washer 5 under prestress, as a result of which the fluid flows back from the cylinder interior 8 into the hydraulic line 3. As described above, it is necessary, in both flow directions, for an initial pressure to be built up before the pressure force of the spring washer 5 or 6 is overcome. The two spring washers 5 and 6 tightly seal their associated passage openings 12, 12' until being opened in their respective directions by fluid due to operation of the operating pedal.

The damping device 7, 7' acts as a vibration filter in one of the two rest positions of the system, i.e., when there is an engaged or disengaged clutch, as long as the fluid vibrating in the hydraulic line 3 cannot open the spring washer 5 or 6 in the flow direction associated with it.

The passage openings 12, 12' covered by the first spring washer 5 may have a different total cross-section that the passage openings 12, 12' covered by the second spring washer 6. When cylinder 1 is an output cylinder, the passage openings 12, 12' of the damping device 7, 7' covered by the first spring washer 5 limit the flow speed of the fluid from the cylinder interior 8 into the hydraulic line 3. As a result, upon sudden release of the operating pedal, the diaphragm spring of the clutch pushes the operating element 20 back into the rest position at a maximum possible speed limited by the throttling of the fluid flow through the damping device 7, 7'. The design of the passage openings 12, 12' thus directly influences the functioning of the adjustment device in the motor vehicle, so that mistakes by the driver can be corrected. There is an operating speed limit that, upon engagement of the clutch, prevents unpleasant jerks when the vehicle is started or during vehicle travel. Conversely, however, it is also possible for the passage openings 12, 12' covered by the second spring washer 6 to be designed in the direction of clutch activation or disengagement so that a certain operating speed cannot be exceeded. This measure, too, helps to prevent unwanted speed changes of the vehicle during travel.

Figure 6:
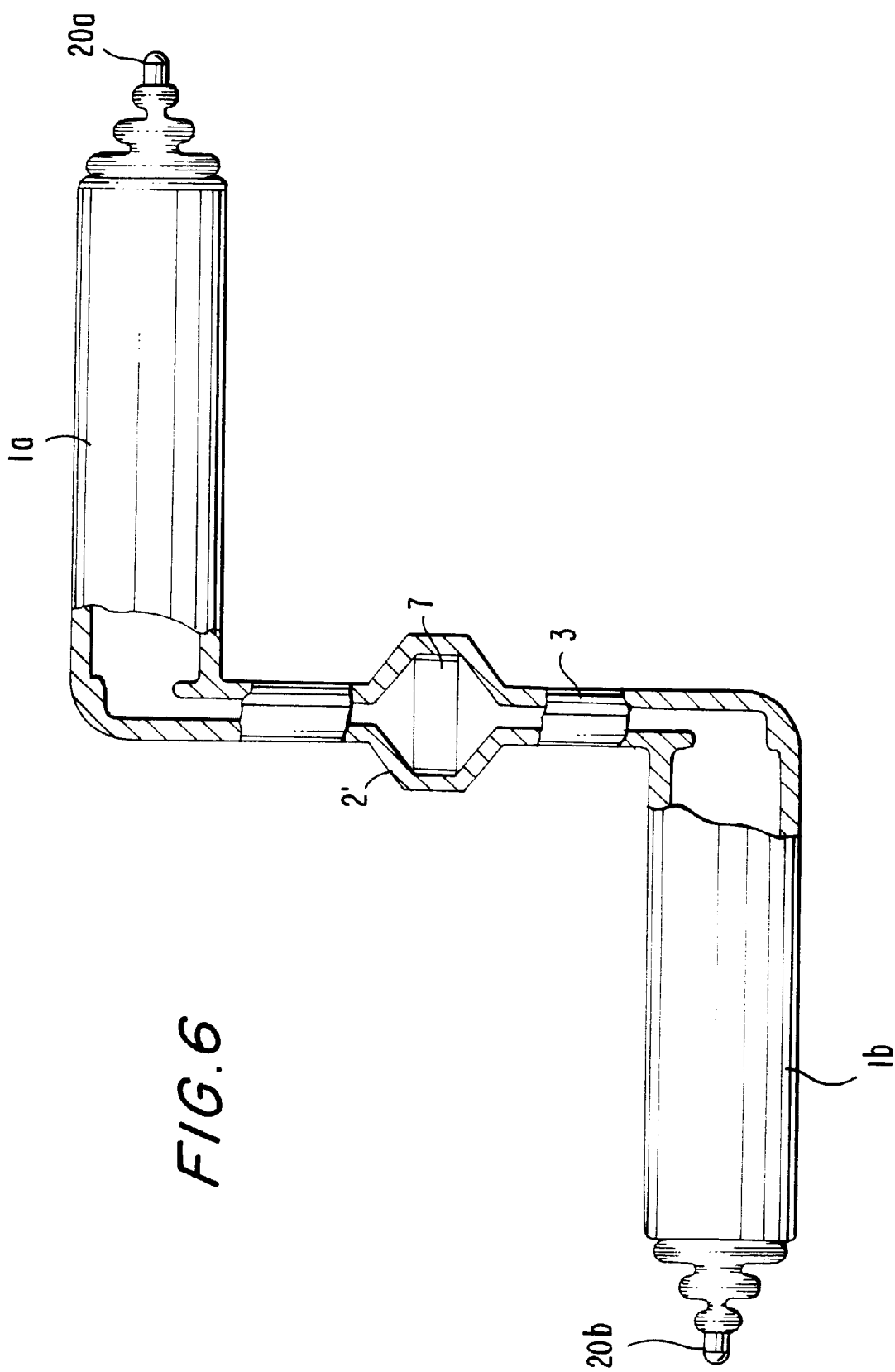
FIG. 6 shows another embodiment of an adjustment device according to the invention.

The cylinder 1 may also be an input cylinder or actuator of a hydraulic adjusting device so that the vibration filter, i.e., the damping device 7, 7' may be located in the housing of the input cylinder or actuator. Referring to FIG. 5, the hydraulic adjustment device may include an input cylinder 1a with an input cylinder damping device 7a and an output cylinder 1b with its own output cylinder damping device 7b. In this embodiment, the input operating element 20a is operable by a foot pedal (not shown) and the output operating element 20b operates on a diaphragm spring of a clutch, for example. In yet another embodiment of the hydraulic adjustment device, FIG. 6 shows a damping device mounted in a housing 2' inserted in the hydraulic line 3. When the vibration filter, and thus the damping device 7, is installed in the hydraulic line 3, it is necessary to install the separate housing 2' exclusively for the damping device 7. For the sake of completeness, it should be noted here that such a solution can be used only in the case of retrofitting or in special cases. The most advantageous location for the damping device is near the point where the vibration originate, i.e., in or on the cylinder 1 of the output cylinder.

Figure 7:
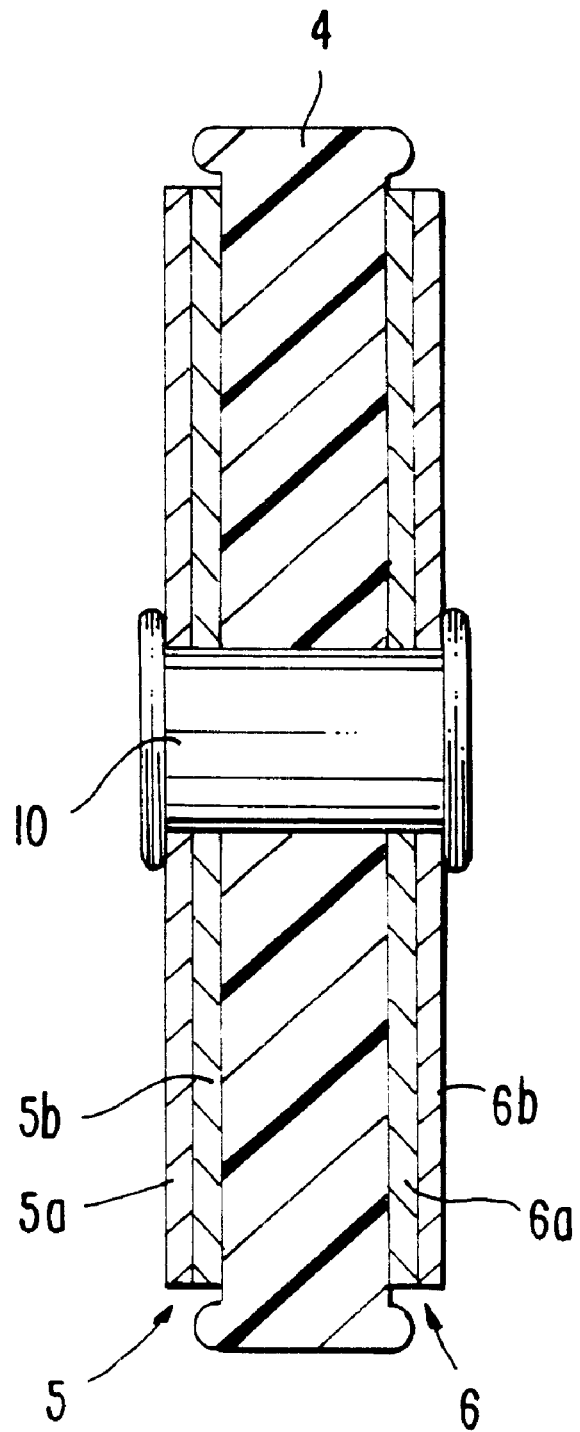
FIG. 7 shows an enlarged view of a damping device according to an embodiment of the invention.

Referring now to FIG. 7, the first spring washer 5 and/or the second spring washer 6 may be embodied as a spring washer packet of multiple spring washers 5*a*, 5*b*, 6*a*, 6*b* lying atop one another. The spring washer packet may include a plastic spring washer 6*a* accompanied by metal spring washer 6*b*, for example, to improve the sealing and damping effects relative to the fluid flowing through the passage openings. The spring washers of the spring washer packet may also comprise the same materials and differ from each other in thickness and/or external form. It is also possible for at least two spring washers 5*a*, 5*b*, 6*a*, 6*b* to be stuck to each other.

The prestress device 10, 10' fixing the first spring washer 5 and/or the second spring washer 6 to the disk 4, 4' may comprise a rivet. However, the prestress device 10, 10' may also comprise a thermally variable support element, e.g., a bimetal or a memory device. This embodiment is advantageous in that the throttling effect in the hydraulic adjustment device for suppressing disturbing vibrations can be kept constant for all ambient temperatures.

Furthermore, when the temperature of the bimetal or memory device falls below a certain limit temperature, the bimetal or memory device may change the valve characteristic of the spring washers 5 and/or 6 so as to counteract a viscosity change of the fluid, which typically increases as the temperature declines.

The invention is not limited by the embodiments described above which are presented as examples only but can be modified in various ways within the scope of protection defined by the appended patent claims.

What is claimed is:

1. A damping device for use with a hydraulic adjustment device having an input cylinder and an output cylinder, the input cylinder being connected to the output cylinder by a hydraulic line filled with fluid, said damping device establishing a throttle resistance to the flow of the fluid in at least one of the two flow directions, said damping device comprising:

a disk having first and second opposing sides and a plurality of passage openings through said disk;

a first spring washer arranged on said first side of said disk;

a second spring washer arranged on said second side of said disk, wherein each said plural passage openings is covered by one of said first and second spring washers; and wherein each said first and second spring washers is operatively arranged with a prestress at said plural passage openings by a prestress device such that each of said plural passages is closed and said damping device remains blocked until said prestress is overcome, said first and second spring washers comprise conical contact surfaces for contacting said disk and a prestress of at least one of said first and second spring washers being adjustable in response to an ambient temperature, wherein said prestress device comprises a variable support device.

2. The damping device of claim 1, wherein said variable support device is one of a bimetal and a memory device.

3. The damping device of claim 1, wherein said variable support device is operatively designed for changing a prestress characteristic when the ambient temperature falls below a defined limit temperature to counteract an increase in the viscosity of the fluid.

4. The damping device of claim 1, wherein at least one of said first and second spring washers comprises a washer packet having a plurality of spring washers, one of said plural spring washers of said washer packet is different from another of said plural spring washers of said washer packet in one of form and material.

5. A combination including a hydraulic adjustment device and a damping device, said hydraulic adjustment device comprising one of an input cylinder and an actuator having an input cylinder interior, an output cylinder having an output cylinder interior, and a hydraulic line filled with a fluid and connecting said input cylinder interior with said output cylinder interior, and said damping device operatively arranged for establishing a throttle resistance to a flow of the fluid in at least one of two flow directions through said hydraulic line, said damping device being arranged within one of said input and output cylinder interiors, and said damping device separating said one of said input and output cylinder interiors from said hydraulic line, wherein said damping device comprises;

a disk having first and second opposing sides and a plurality of passage openings through said disk;

a first spring washer arranged on said first side of said disk;

a second spring washer arranged on said second side of said disk, wherein each said passage openings is covered by one of said first and second spring washers; and wherein said first and second spring washers are held under prestress by a prestress device against said plural passage openings and said first and second spring washers comprise conical contact surfaces for contacting said disk.

6. The combination of claim 5, wherein said damping device comprises a first damping device arranged in a first cylinder interior of said one of an input cylinder and an actuator and a second damping device arranged in a second cylinder interior of said output cylinder, said first and second damping devices respectively separating said first and second cylinder interiors from said hydraulic line.

7. A combination including a hydraulic adjustment device and a damping device, said hydraulic adjustment device comprising one of an input cylinder and an actuator having an input cylinder interior, an output cylinder having an output cylinder interior, and a hydraulic line filled with a fluid and connecting said input cylinder interior with said output cylinder interior, and said damping device operatively arranged for establishing a throttle resistance to a flow of the fluid in at least one of two flow directions through said hydraulic line, wherein said damping device is arranged in said hydraulic line between said output cylinder and said one of said input cylinder and said actuator and wherein said damping device comprises:

a disk having first and second opposing sides and a plurality of passage openings through said disk;

a first spring washer arranged on said first side of said disk;

a second spring washer arranged on said second side of said disk, wherein each said passage openings is covered by one of said first and second spring washers; and wherein said first and second spring washers are held under prestress by a prestress device against said plural passage openings and said first and second spring washers comprise conical contact surfaces for contacting said disk.

8. The combination of claim 5, wherein said damping device is arranged in a housing proximate a bottom of said one of said input and output cylinder interiors and separates said cylinder interior from said hydraulic line.

9. The combination of claim 5, wherein said damping device comprises a disk having through passages is arranged proximate a bottom of said one of said input and output cylinder interiors.

10. The combination of claim 9, wherein said disk is fixedly held in said one of said input and output cylinder interiors in a friction-locking connection.

11. The combination of claim 9, wherein said disk further comprises a seal for contacting said one of said input and output cylinder interiors.

12. The combination of claim 9, further comprising a resilient device for holding said disk in a position proximate said bottom of said one of said input and output cylinder interiors.

13. The combination of claim 12, wherein said resilient device comprises a spring.

14. The combination of claim 9, further comprising a snap projection for holding said disk in a position proximate said bottom of said one of said input and output cylinder interiors in a positive-locking connection.

15. The combination of claim 9, wherein said disk is connected to said one of said input and output cylinder interiors via a material-bonded connection.

16. The combination of claim 15, wherein said material-bonded connection comprises an ultrasonic seal.

17. The combination of claim 9, wherein said prestress of at least one of said first and second spring washers is adjustable in response to an ambient temperature.

18. The combination of claim 17, wherein said prestress device comprises a variable support device.

19. The combination of claim 18, wherein said variable support device comprises one of a bimetal and a memory device.

20. The combination of claim 18, wherein said variable support device is operatively designed for changing a prestress characteristic when the ambient temperature falls below a defined limit temperature to counteract an increase in the viscosity of the fluid.

21. The combination of claim 17, wherein at least one of said first and second spring washers comprises a washer packet having a plurality of spring washers, and wherein one of said plural spring washers of said washer packet is different from another of said plural spring washers of said washer packet in one of form and material.

22. A combination comprising a hydraulic adjustment device for actuating a motor vehicle clutch and a damping device, said hydraulic adjustment device having one of an input cylinder and an actuator having an input cylinder interior, an output cylinder having an output cylinder interior, and a hydraulic line filled with a fluid and connecting said input cylinder interior with said output cylinder interior, and said damping device operatively arranged for exerting a throttling effect on the fluid flowing toward said one of said input cylinder and said actuator during clutch engagement such that a maximum permissible clutch engagement speed is not exceeded, said damping device comprising:
 a disk having first and second opposing sides and a plurality of passage openings through said disk;
 a first spring washer arranged on said first side of said disk;
 a second spring washer arranged on said second side of said disk, wherein each said passage openings is covered by one of said first and second spring washers; and
 wherein said first and second spring washers are held under prestress by a prestress device against said plural passage openings and said first and second spring washers comprise conical contact surfaces for contacting said disk.

23. The combination of claim 22, wherein said disk has a plurality of passage openings having cross-sections operatively designed for exerting the throttling effect on the fluid flowing toward said one of said input cylinder and said actuator such that the maximum permissible clutch engagement speed is not exceeded.

24. The combination of claim 22, wherein said damping device is operatively arranged for exerting a throttling effect on the fluid flowing toward said output cylinder such that an operating speed for disengagement of the clutch does not fall below a minimum permissible disengagement speed.

25. The combination of claim 24, wherein said disk has a plurality of passage openings having cross-sections operatively designed for exerting the throttling effect on the fluid flowing toward said one of said input cylinder and said actuator such that the operating speed for disengagement of the clutch does not fall below a minimum permissible disengagement speed.

26. The combination of claim 22, having a plurality of passage openings, first and second spring washers, and a prestress device for holding the first and second washers under a prestress against opposing sides of said disk, wherein said prestress of at least one of said first and second spring washers is adjustable in response to an ambient temperature.

27. The combination of claim 26, wherein said prestress device comprises a variable support device.

28. The combination of claim 27, wherein said variable support device comprises one of a bimetal and a memory device.

29. The combination of claim 27, wherein said variable support device being operatively designed for changing a prestress characteristic when the ambient temperature falls below a defined limit temperature to counteract an increase in the viscosity of the fluid.

30. The combination of claim 26, wherein at least one of said first and second spring washers comprises a washer packet having a plurality of spring washers, one of said plural spring washers of said washer packet is different from another of said plural spring washers of said washer packet in one of form and material.

31. A damping device for installation in a hydraulic adjustment device having an input cylinder with an input cylinder housing enclosing an input cylinder interior, an output cylinder with an output cylinder housing encompassing an output cylinder interior, and a hydraulic line connecting the input cylinder interior to the output cylinder interior, said damping device configured so as to be arrangable in one of the input cylinder housing and the output cylinder housing for separating a respective one of the input cylinder interior and the output cylinder interior from the hydraulic line, wherein said damping device comprises:
 a disk having first and second opposing sides and a plurality of passage openings through said disk;
 a first spring washer arranged on said first side of said disk;
 a second spring washer arranged on said second side of said disk, wherein each said passage openings is covered by one of said first and second spring washers; and
 wherein said first and second spring washers are held under prestress by a prestress device against said plural passage openings and said first and second spring washers comprise conical contact surfaces for contacting said disk, wherein said prestress of at least one of said first and second spring washers is adjustable in response to an ambient temperature, and wherein said prestress device comprises a variable support device.

32. The damping device of claim 31, wherein said variable support device comprises one of a bimetal and a memory device.

33. The damping device of claim 31, wherein said variable support device is operatively designed for changing a prestress characteristic when the ambient temperature falls below a defined limit temperature to counteract an increase in the viscosity of the fluid.

34. The damping device of claim 31, wherein at least one of said first and second spring washers comprises a washer packet having a plurality of spring washers, and wherein one of said plural spring washers of said washer packet is different from another of said plural spring washers of said washer packet in one of form and material.

35. A damping device for installation in a hydraulic adjustment device for operating a hydraulic clutch having an input cylinder with an input cylinder housing enclosing an input cylinder interior, an output cylinder with an output cylinder housing encompassing an output cylinder interior, and a hydraulic line filled with hydraulic fluid and connecting the input cylinder interior to the output cylinder interior, said damping device operatively arranged for exerting a throttling effect on a flow of the hydraulic fluid flowing toward the input cylinder so that a maximum permissible clutch engagement speed is not exceeded, wherein said damping device comprises:

a disk having first and second opposing sides and a plurality of passage openings through said disk;

a first spring washer arranged on said first side of said disk;

a second spring washer arranged on said second side of said disk, wherein each said passage openings is covered by one of said first and second spring washers; and wherein said first and second spring washers are held under prestress by a prestress device against said plural passage openings and said first and second spring washers comprise conical contact surfaces for contacting said disk, wherein said prestress of at least one of said first and second spring washers is adjustable in response to an ambient temperature, wherein said prestress device comprises a variable support device.

36. The damping device of claim 35, wherein said variable support device comprises one of a bimetal and a memory device.

37. The damping device of claim 35, wherein said variable support device is operatively designed for changing a prestress characteristic when the ambient temperature falls below a defined limit temperature to counteract an increase in the viscosity of the fluid.

38. The damping device of claim 35, wherein at least one of said first and second spring washers comprises a washer packet having a plurality of spring washers, and wherein one of said plural spring washers of said washer packet is different from another of said plural spring washers of said washer packet in one of form and material.

* * * * *